(12) United States Patent
Yamashiro

(10) Patent No.: US 12,049,150 B2
(45) Date of Patent: Jul. 30, 2024

(54) POWER SOURCE DEVICE, AND ELECTRIC VEHICLE AND ELECTRICITY STORAGE DEVICE EMPLOYING SAME

(71) Applicant: SANYO Electric Co., Ltd., Osaka (JP)

(72) Inventor: Go Yamashiro, Hyogo (JP)

(73) Assignee: SANYO Electric Co., Ltd., Osaka (JP)

(\*) Notice: Subject to any disclaimer, the term of this patent is extended or adjusted under 35 U.S.C. 154(b) by 485 days.

(21) Appl. No.: 17/441,237

(22) PCT Filed: Dec. 20, 2019

(86) PCT No.: PCT/JP2019/050065
§ 371 (c)(1),
(2) Date: Sep. 20, 2021

(87) PCT Pub. No.: WO2020/202664
PCT Pub. Date: Oct. 8, 2020

(65) Prior Publication Data
US 2022/0173470 A1    Jun. 2, 2022

(30) Foreign Application Priority Data

Mar. 29, 2019   (JP) .................................. 2019-066827

(51) Int. Cl.
*B60L 50/64* (2019.01)
*B60K 1/04* (2019.01)
(Continued)

(52) U.S. Cl.
CPC ................ *B60L 53/60* (2019.02); *B60K 1/04* (2013.01); *B60L 50/64* (2019.02); *H01M 10/0481* (2013.01); *H01M 10/0525* (2013.01); *H01M 10/4207* (2013.01); *H01M 10/425* (2013.01); *H01M 50/209* (2021.01); *H01M 50/224* (2021.01); *H01M 50/249* (2021.01); *H01M 50/262* (2021.01); *H01M 50/264* (2021.01);
(Continued)

(58) Field of Classification Search
None
See application file for complete search history.

(56) References Cited

U.S. PATENT DOCUMENTS 5,766,801 A    6/1998 Inoue et al.
2018/0097211 A1\*   4/2018 Choi .................. H01M 50/262

FOREIGN PATENT DOCUMENTS

JP    9-120808    5/1997

OTHER PUBLICATIONS

International Search Report of PCT application No. PCT/JP2019/050065 dated Mar. 31, 2020.

\* cited by examiner

*Primary Examiner* — Wyatt P McConnell
(74) *Attorney, Agent, or Firm* — WHDA, LLP

(57) ABSTRACT

Power supply device includes: a plurality of secondary battery cells each having a prismatic exterior can and constant cell thickness; a pair of end plates covering both end surfaces of battery stack body in which the plurality of secondary battery cells are stacked; and a plurality of fastening members each having a plate shape extending in a stack direction of the plurality of secondary battery cells and disposed on an opposing side surface of battery stack body to fasten end plates to each other. Each of the plurality of fastening members has wavy portion in which a plurality of wavy pieces bent in a cross-sectional view are periodically disposed at an interval according to the cell thickness.

10 Claims, 16 Drawing Sheets

(51) Int. Cl.
*B60L 53/60* (2019.01)
*H01M 10/04* (2006.01)
*H01M 10/0525* (2010.01)
*H01M 10/42* (2006.01)
*H01M 50/209* (2021.01)
*H01M 50/224* (2021.01)
*H01M 50/249* (2021.01)
*H01M 50/262* (2021.01)
*H01M 50/264* (2021.01)
*H01M 50/289* (2021.01)
*H02J 7/02* (2016.01)
*H02J 7/35* (2006.01)

(52) U.S. Cl.
CPC ............. *H01M 50/289* (2021.01); *H02J 7/02* (2013.01); *H02J 7/35* (2013.01); *H01M 2010/4271* (2013.01); *H01M 2220/20* (2013.01)

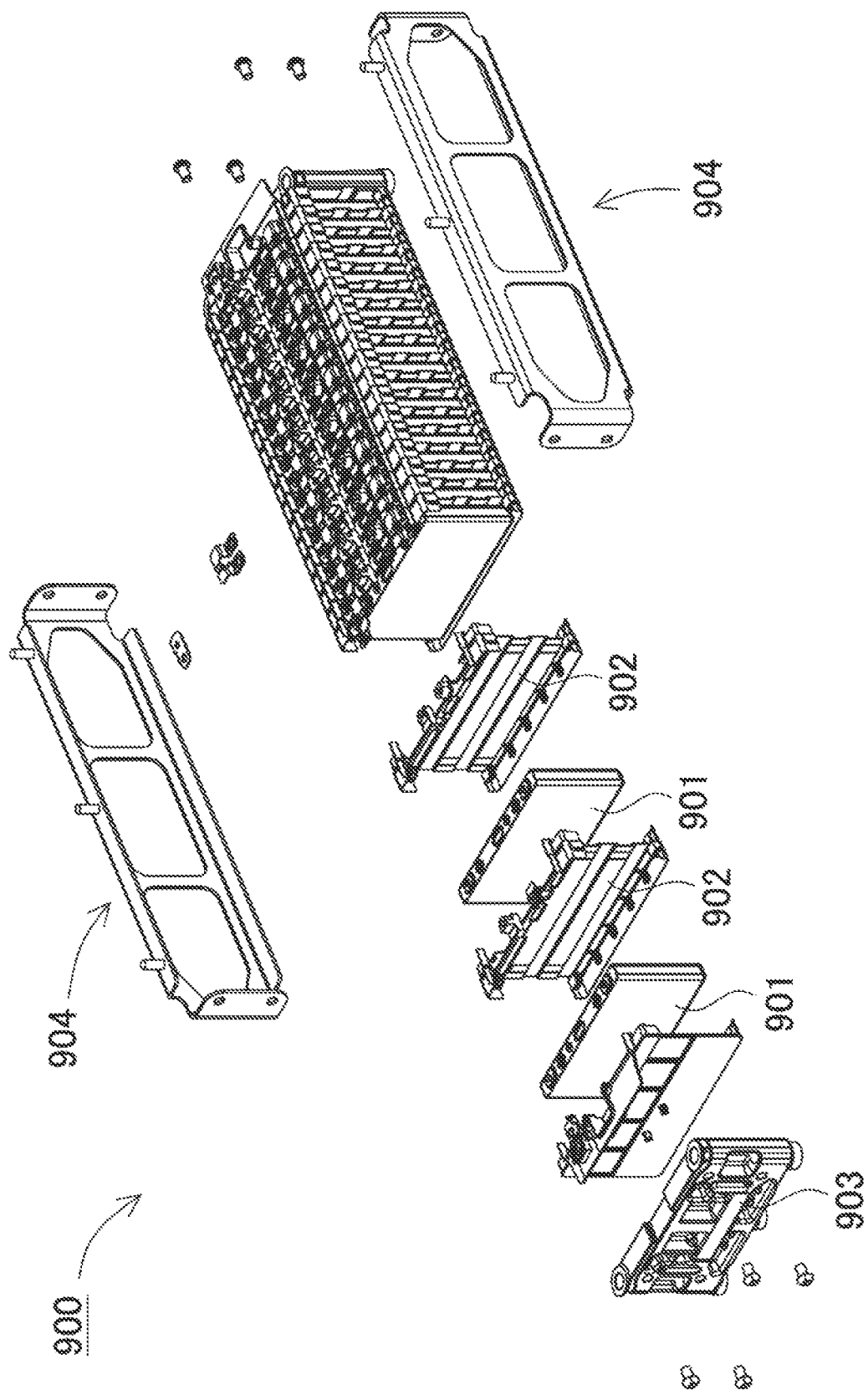

POWER SOURCE DEVICE, AND ELECTRIC VEHICLE AND ELECTRICITY STORAGE DEVICE EMPLOYING SAME

CROSS-REFERENCE TO RELATED APPLICATIONS

This application is a U.S. national stage application of the PCT International Application No. PCT/JP2019/050065 filed on Dec. 20, 2019, which claims the benefit of foreign priority of Japanese patent application No. 2019-066827 filed on Mar. 29, 2019, the contents all of which are incorporated herein by reference.

TECHNICAL FIELD

The present invention relates to a power supply device, and an electric vehicle and a power storage device employing the same.

BACKGROUND ART

The power supply device is used as a power supply device for driving an electric vehicle, a power supply device for power storage, and the like. In such a power supply device, a plurality of chargeable and dischargeable secondary battery cells are stacked. In general, as shown in a perspective view of FIG. 16, in power supply device 900, end plates 903 are disposed on both end surfaces of a battery stack body in which secondary battery cells 901 of a prismatic exterior can are alternately stacked with insulating spacers 902, and end plates 903 are fastened to each other with binding bar 904 made of metal.

When the secondary battery cell is repeatedly charged and discharged, the exterior can expands and contracts. In particular, with the recent demand for high capacity, the capacity per secondary battery cell has been increasing, and as a result, the expansion amount tends to increase. In the battery stack body in which a large number of such secondary battery cells are stacked and fastened, the expansion amount also increases with a number of the secondary battery cells, and the load on the binding bar increases.

However, the binding bar is made of metal because it is required to have strength but metal has low elasticity, and it is difficult for the binding bar to recover from stretching. Therefore, the binding bar has a problem that it is difficult to follow deformation to expansion of the secondary battery cell.

CITATION LIST

Patent Literature

PTL 1: Unexamined Japanese Patent Publication No. H9-120808

SUMMARY OF THE INVENTION

An object of the present invention is to provide a power supply device having enhanced followability to deformation such as expansion and contraction of a secondary battery cell, and an electric vehicle and a power storage device employing the power supply device.

A power supply device according to an aspect of the present invention includes: a plurality of secondary battery cells each having a prismatic exterior can and a constant cell thickness; a pair of end plates covering both end surfaces of a battery stack body in which the plurality of secondary battery cells are stacked; and a plurality of fastening members each having a plate shape extending in a stack direction of the plurality of secondary battery cells and disposed on an opposing side surface of the battery stack body to fasten the end plates to each other. Each of the plurality of fastening members has a wavy portion in which a plurality of wavy pieces bent in a cross-sectional view are periodically disposed at an interval according to the cell thickness.

According to the power supply device described above, even if the battery stack body becomes long in the stack direction due to expansion of the secondary battery cells, the wavy portion is deformed, so that displacement of the battery stack body can be absorbed and the fastened state can be maintained.

BRIEF DESCRIPTION OF DRAWINGS

FIG. 16 is an exploded perspective view showing a conventional power supply device.

DESCRIPTION OF EMBODIMENTS

Figure 1:
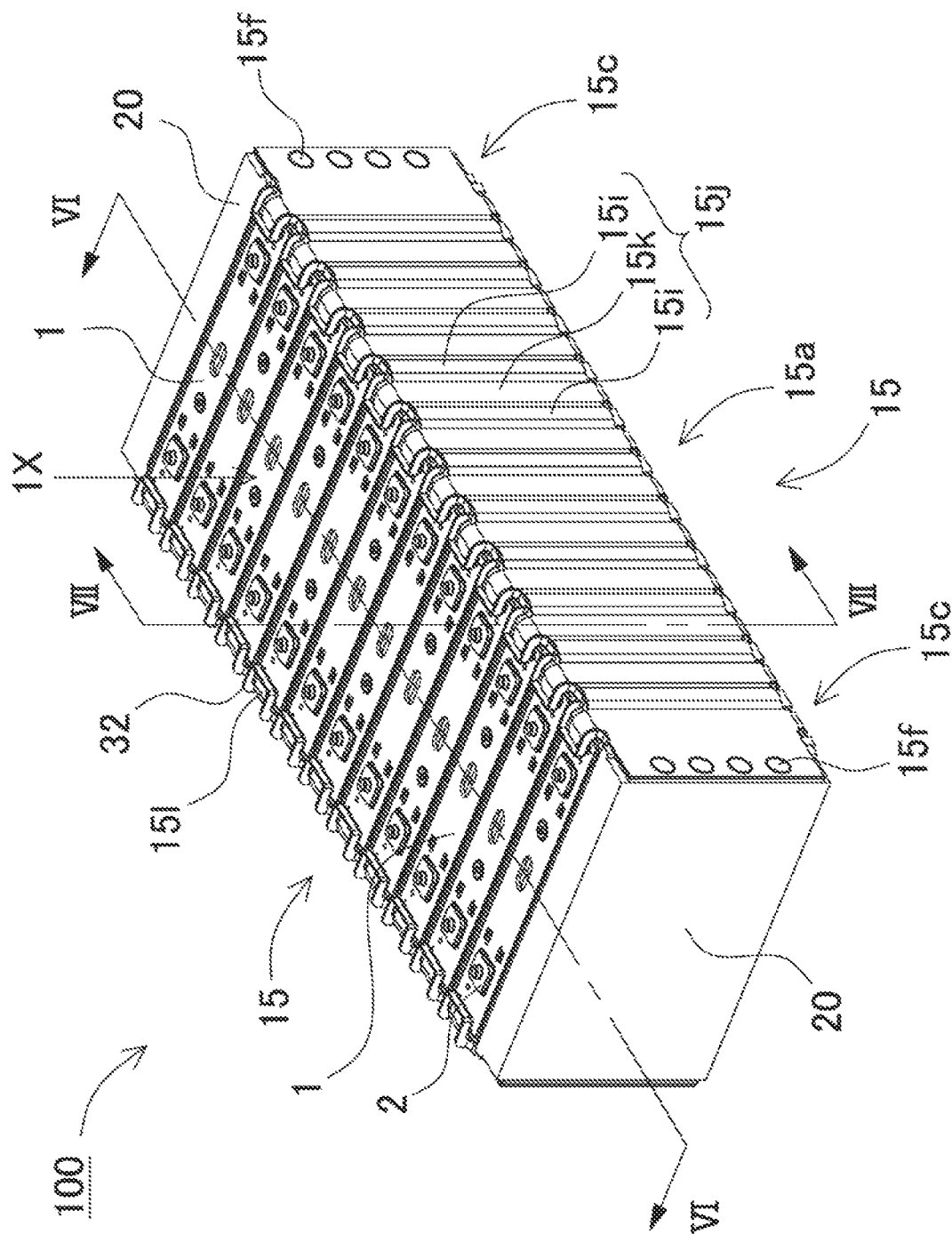
FIG. 1 is a perspective view showing a power supply device according to a first exemplary embodiment.

Exemplary embodiments of the present invention may be specified by the following configurations.

A power supply device according to one exemplary embodiment of the present invention includes: a plurality of secondary battery cells each having a prismatic exterior can and a constant cell thickness; a pair of end plates covering both end surfaces of a battery stack body in which the plurality of secondary battery cells are stacked; and a plurality of fastening members each having a plate shape extending in a stack direction of the plurality of secondary battery cells and disposed on an opposing side surface of the battery stack body to fasten the end plates to each other. Each of the plurality of fastening members has a wavy portion in which a plurality of wavy pieces bent in a cross-sectional view are periodically disposed at an interval according to the cell thickness.

In a power supply device according to another exemplary embodiment of the present invention, at least one of the wavy pieces is disposed for the plurality of secondary battery cells.

In addition, in a power supply device according to another exemplary embodiment of the present invention, the wavy piece is disposed for each of the cell thicknesses.

Furthermore, in a power supply device according to another exemplary embodiment of the present invention, the wavy piece is bent in a chevron shape in a direction of expanding outward of the battery stack body.

Moreover, in a power supply device according to another exemplary embodiment of the present invention, the wavy portion is disposed in a spring shape.

Moreover, in a power supply device according to another exemplary embodiment of the present invention, each of the plurality of fastening members includes a tab abutting on an upper surface of a secondary battery cell of the battery stack body.

Moreover, in a power supply device according to another exemplary embodiment of the present invention, the tab is disposed into a flat piece with a flat shape formed between the wavy pieces.

Moreover, in a power supply device according to another exemplary embodiment of the present invention, the plurality of fastening members are made of metal, and the power supply device further includes an insulating sheet interposed between each of the plurality of fastening members and the battery stack body.

Moreover, an electric vehicle according to another exemplary embodiment of the present invention includes any of the power supply devices described above, a traveling motor to which electric power is supplied from the power supply device, a vehicle body on which the power supply device and the motor are mounted, and wheels driven by the motor to cause the vehicle body to travel.

Moreover, a power storage device according to another exemplary embodiment of the present invention includes any of the power supply devices described above, and a power supply controller controlling charging and discharging of the power supply device, and the power supply controller enables charging of the secondary battery cell by external electric power and controls the secondary battery cell so as to charge.

Exemplary embodiments of the present invention will be described below with reference to the drawings. However, the exemplary embodiments described below are examples for embodying the technical idea of the present invention, and the present invention is not limited to the following. In addition, the present description does not specify the members shown in the claims to the members of the exemplary embodiments in any way. In particular, unless otherwise specified, dimensions, materials, shapes, relative arrangements, and the like of the components described in the exemplary embodiments are not intended to limit the scope of the present invention thereto, but are merely illustrative examples. Note that sizes, positional relationships, and the like of members illustrated in the drawings may be exaggerated for clarity of description. Furthermore, in the following description, the identical names and reference numerals indicate the identical members or members of the same nature, and detailed description thereof will be omitted as appropriate. Furthermore, each element constituting the present invention may be achieved in an aspect in which a plurality of elements include the identical member and one member serves as the plurality of elements, or conversely, can be achieved with a function of one member being shared by a plurality of members. In addition, some contents described in some examples and exemplary embodiments can be used in another example, exemplary embodiment, and the like.

The power supply device according to the exemplary embodiment is used for various applications such as a power supply that is mounted on an electric vehicle such as a hybrid vehicle or an electric vehicle and supplies electric power to a traveling motor, a power supply that stores generated power of natural energy such as solar power generation and wind power generation, and a power supply that stores midnight electric power. The power supply device according to the exemplary embodiment is used as a power supply suitable for high-power, high-current applications in particular. In the following example, an exemplary embodiment will be described in which the power supply device according to the exemplary embodiment is applied to a power supply device for driving an electric vehicle.

[First Exemplary Embodiment]

Figure 2:
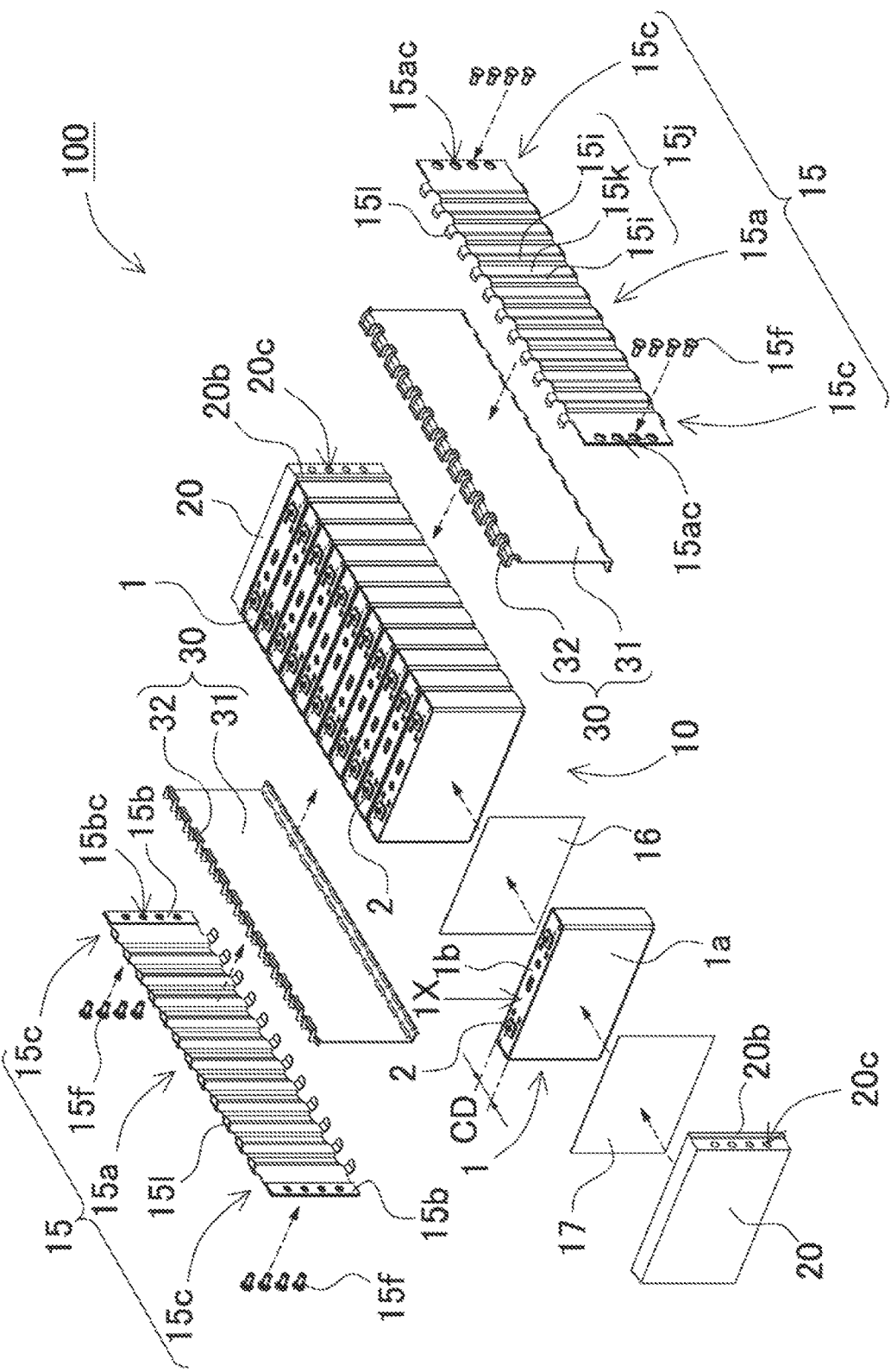
FIG. 2 is an exploded perspective view of the power supply device of FIG. 1.
Figure 3:
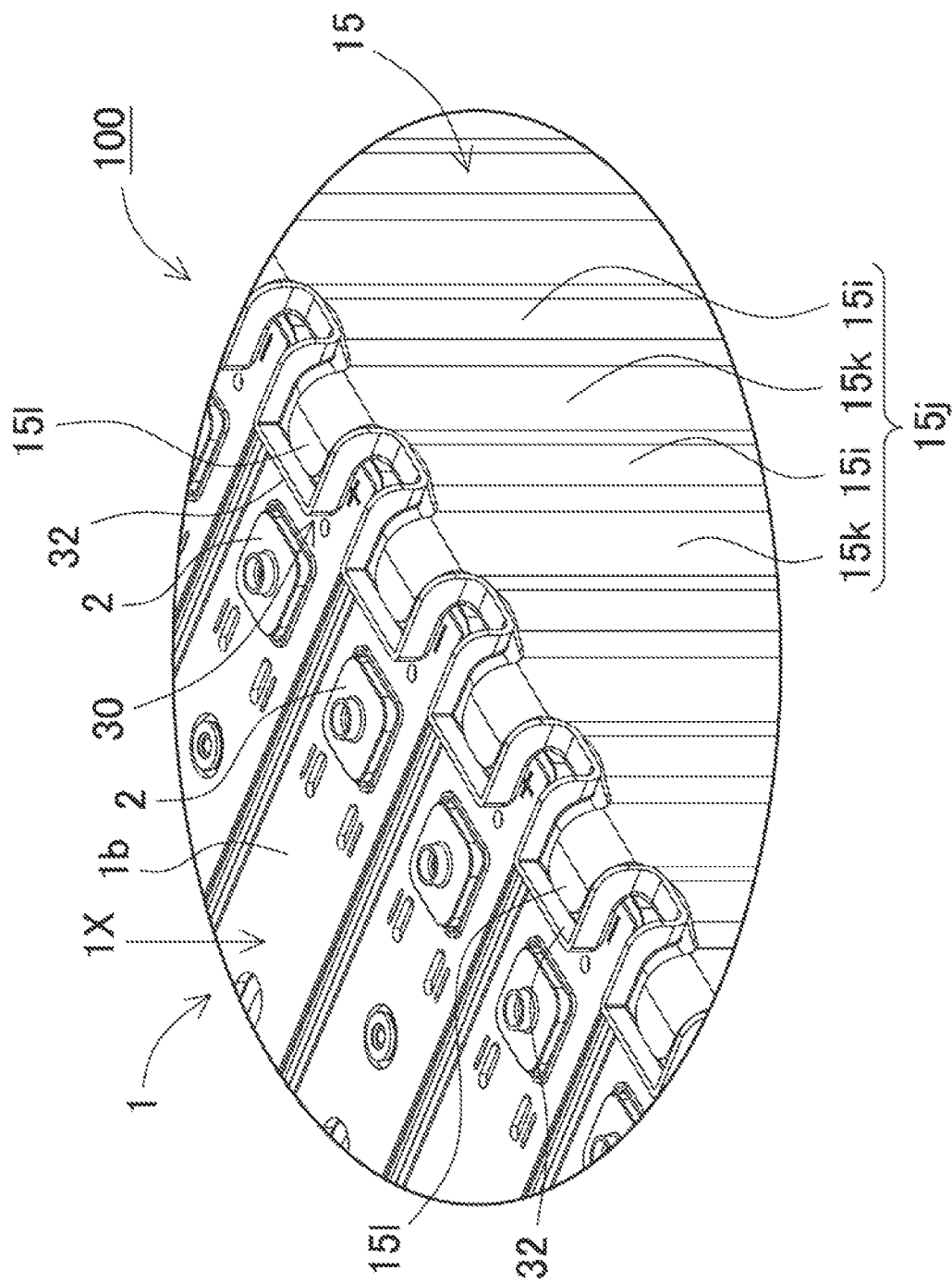
FIG. 3 is an enlarged perspective view of a main part of the power supply device of FIG. 1.
Figure 4:
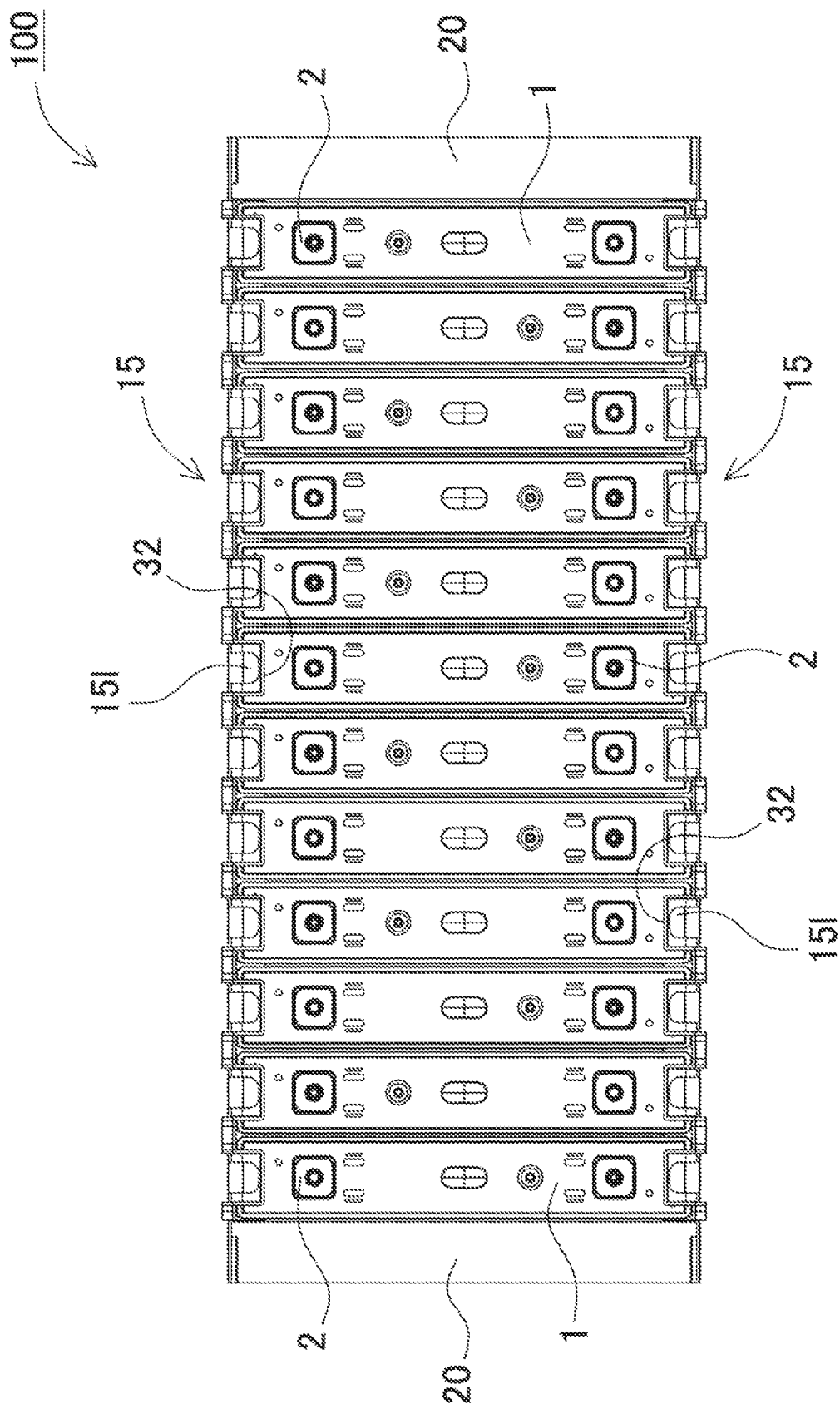
FIG. 4 is a plan view of the power supply device of FIG. 1.
Figure 5:
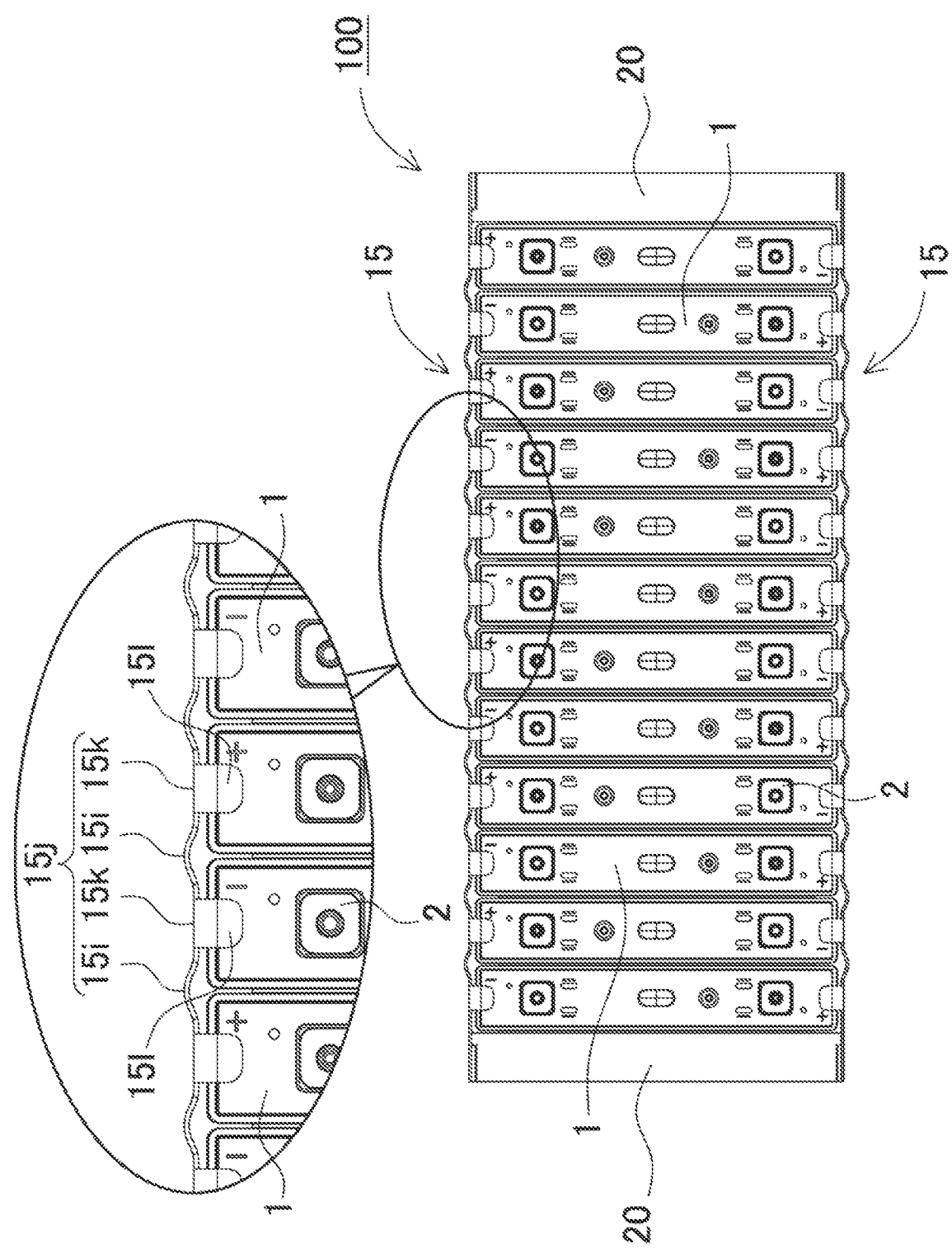
FIG. 5 is a plan view and an enlarged plan view of a main part of the power supply device of FIG. 4 without illustration of an insulating sheet.
Figure 6:
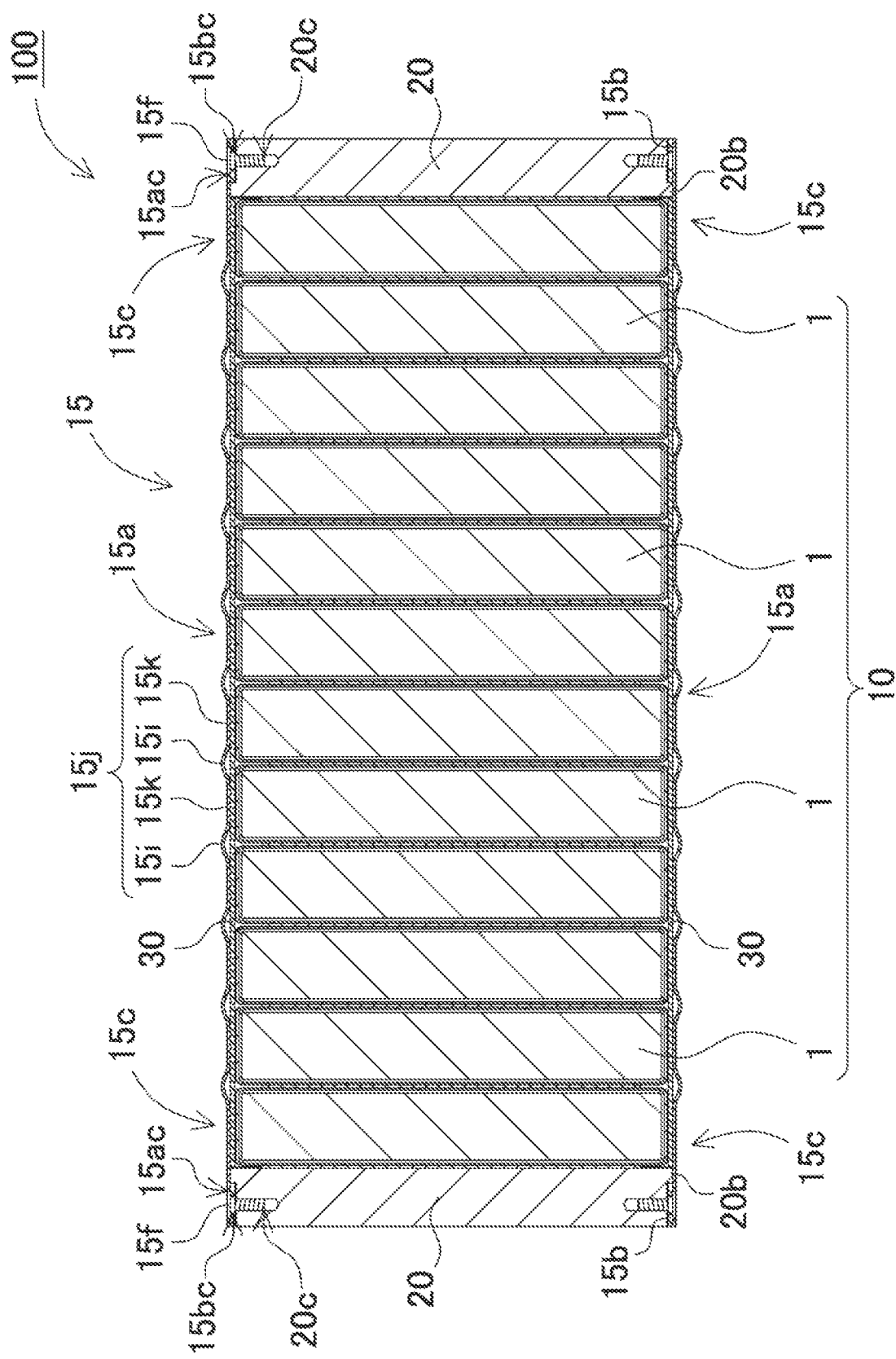
FIG. 6 is a horizontal cross-sectional view taken along line VI-VI of the power supply device of FIG. 1.
Figure 7:
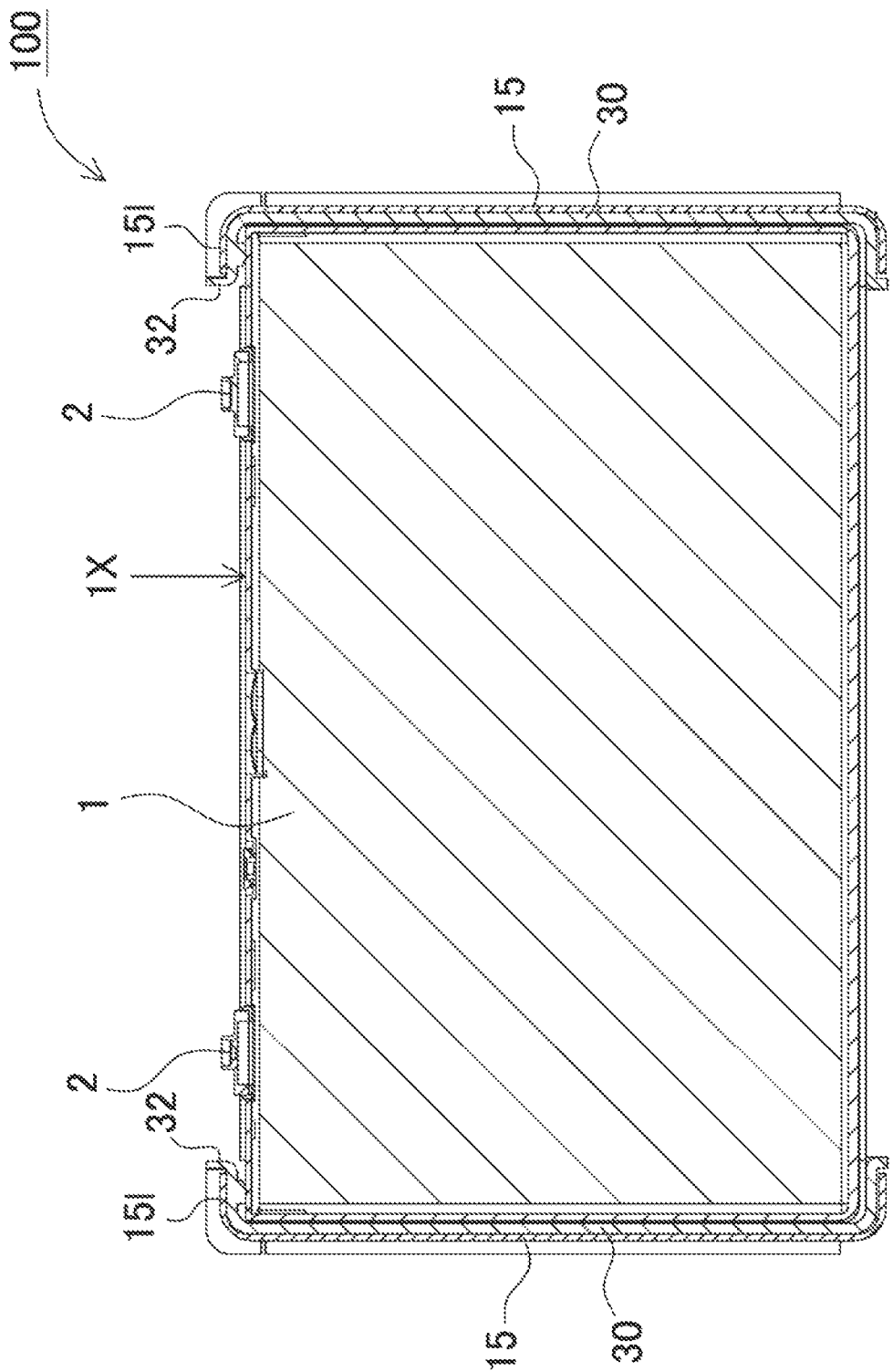
FIG. 7 is a vertical cross-sectional view taken along line VII-VII of the power supply device of FIG. 1.
Figure 8:
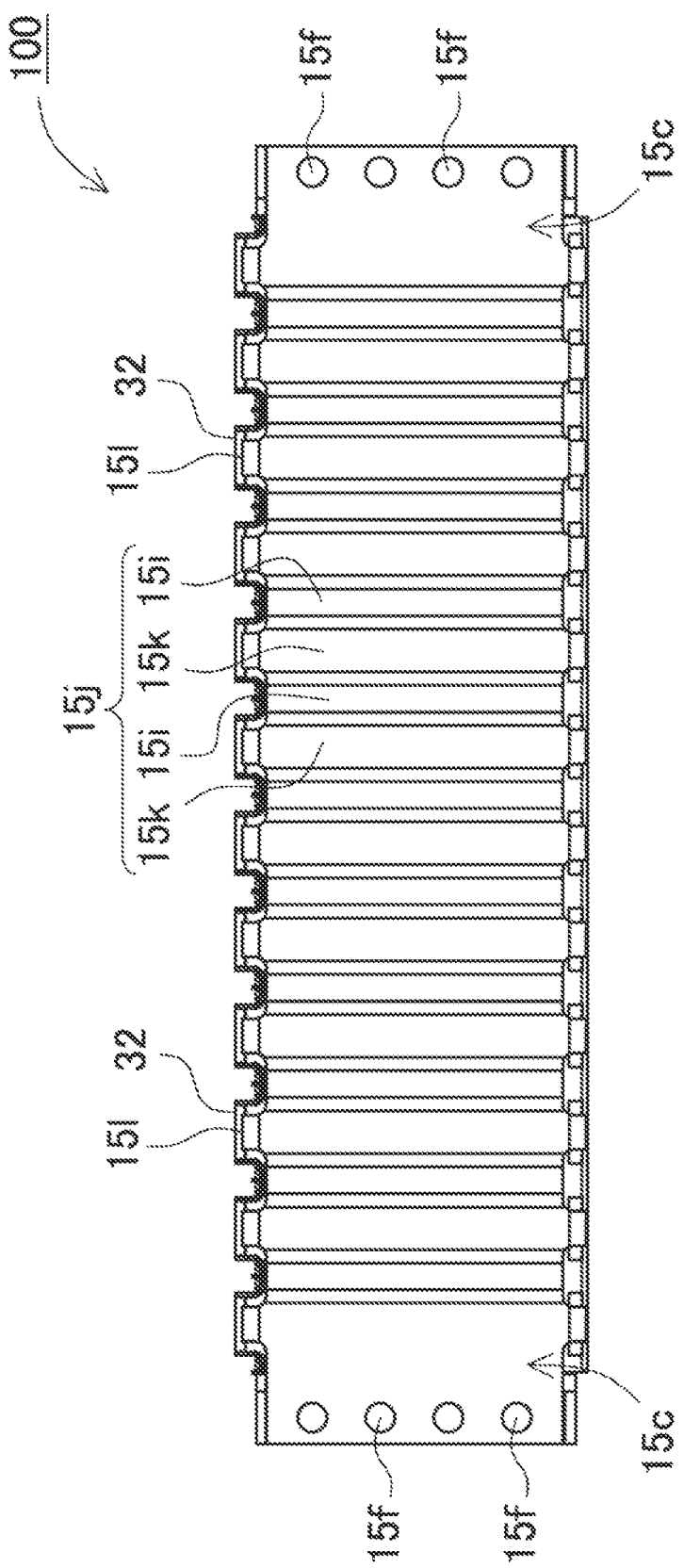
FIG. 8 is a side view of the power supply device of FIG. 1.
Figure 9:
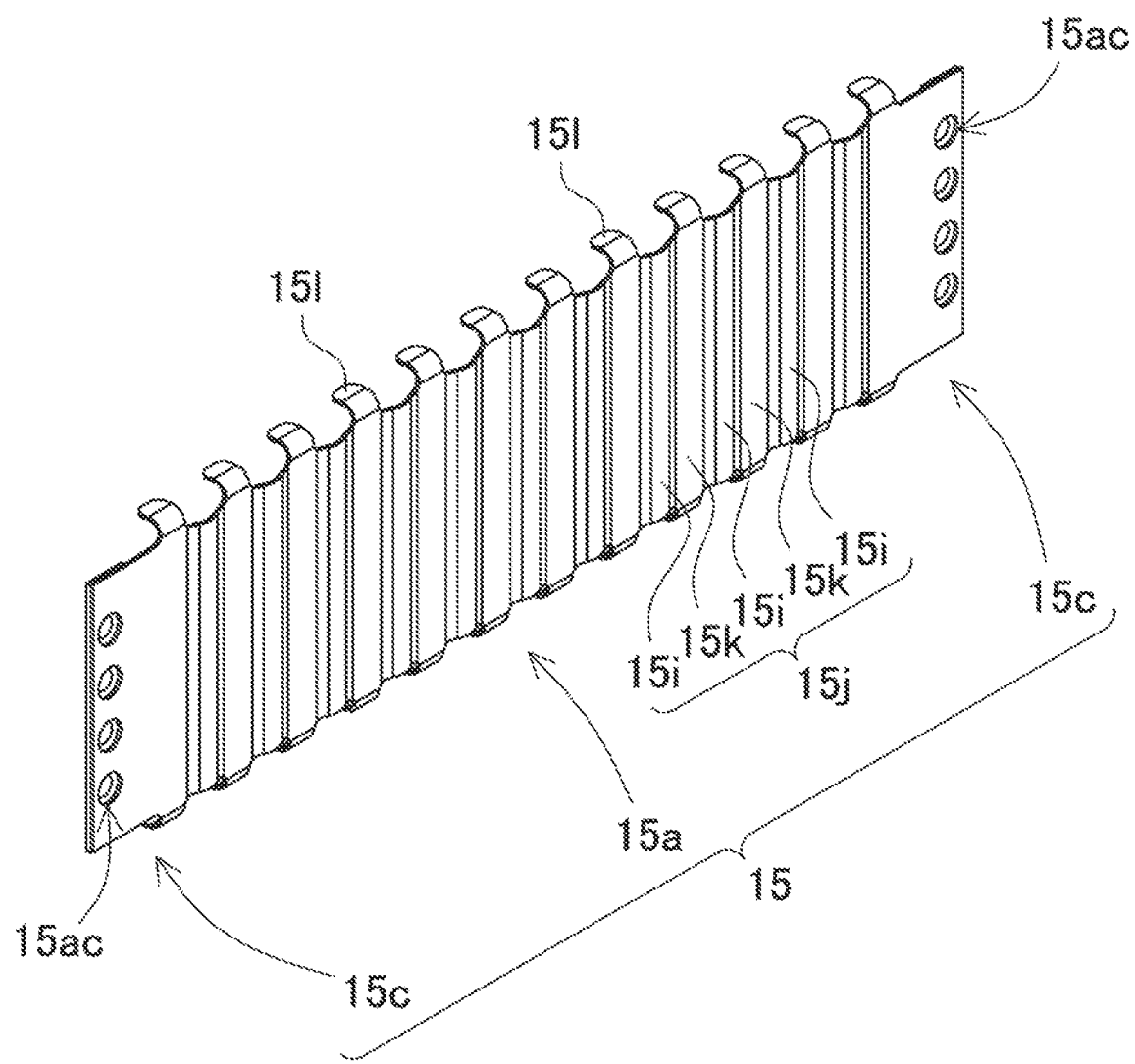
FIG. 9 is a perspective view showing a fastening member of FIG. 2.
Figure 10:
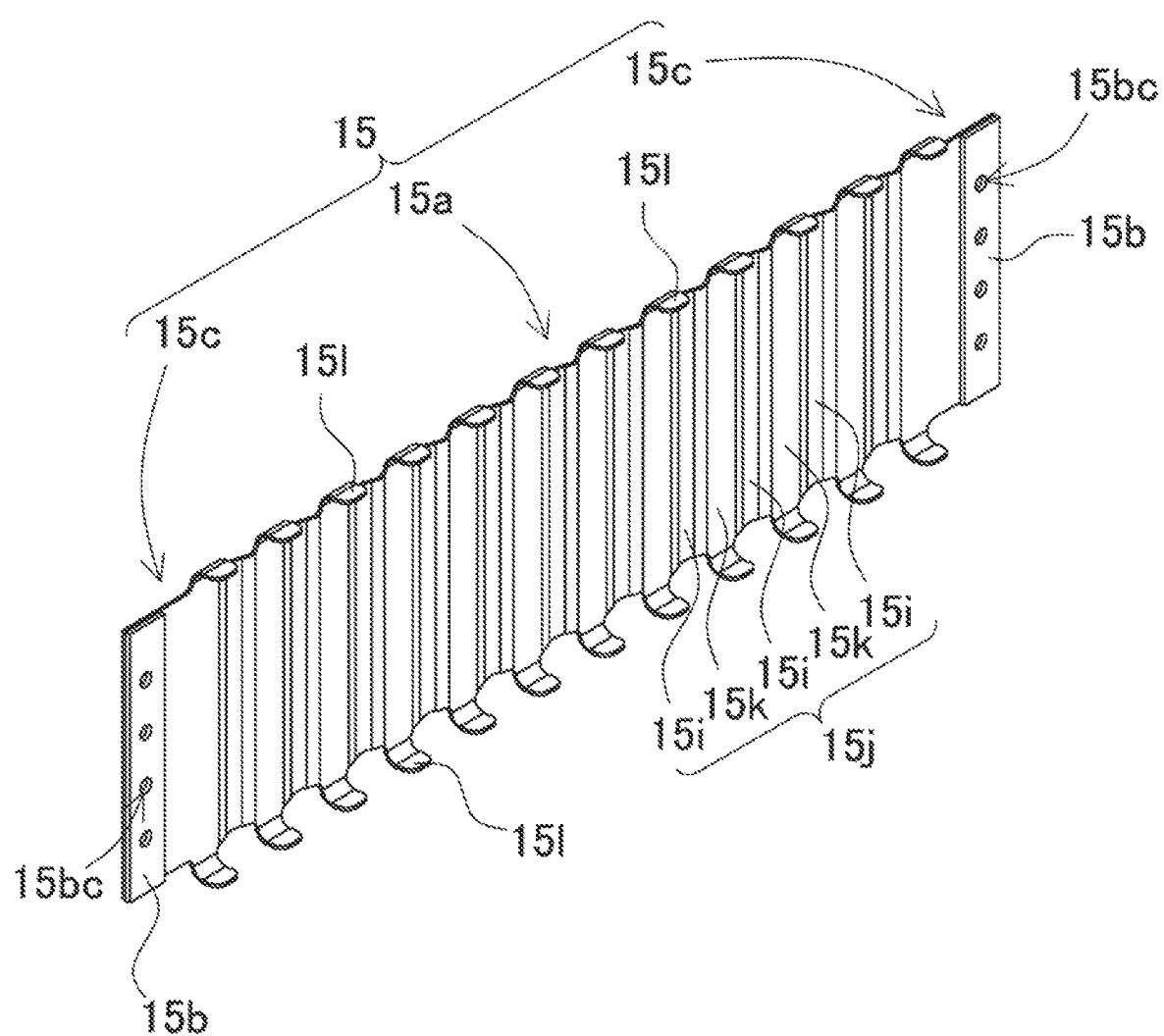
FIG. 10 is a perspective view of the fastening member of FIG. 9 as viewed from a rear surface.
Figure 11:
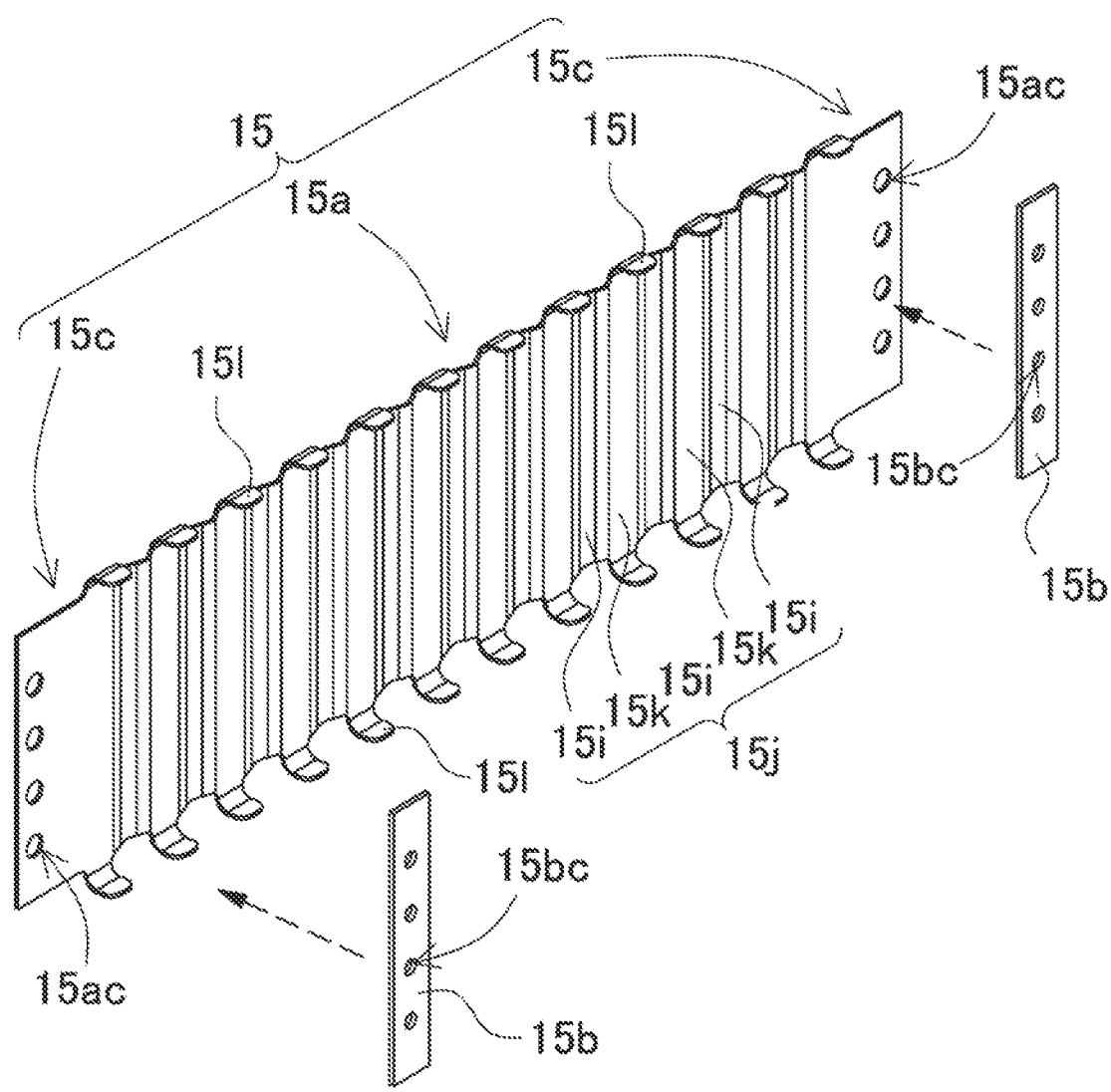
FIG. 11 is an exploded perspective view of the fastening member of FIG. 10.

Power supply device 100 according to a first exemplary embodiment of the present invention is shown in FIGS. 1 to 11. In these figures, FIG. 1 is a perspective view showing power supply device 100 according to the first exemplary embodiment, FIG. 2 is an exploded perspective view of power supply device 100 of FIG. 1, FIG. 3 is an enlarged perspective view of a main part of power supply device 100 of FIG. 1, FIG. 4 is a plan view of power supply device 100 of FIG. 1, FIG. 5 is a plan view and an enlarged plan view of a main part of power supply device 100 of FIG. 4 without illustration of insulating sheet 30, FIG. 6 is a horizontal cross-sectional view taken along line VI-VI of power supply device 100 of FIG. 1, FIG. 7 is a vertical cross-sectional view taken along line VII-VII of power supply device 100 of FIG. 1, FIG. 8 is a side view of power supply device 100 of FIG. 1, FIG. 9 is a perspective view showing fastening member 15 of FIG. 2, FIG. 10 is a perspective view of fastening member 15 of FIG. 9 as viewed from a rear surface, and FIG. 11 is an exploded perspective view of fastening member 15 of FIG. 10. Power supply device 100 shown in these figures includes battery stack body 10 in which a plurality of secondary battery cells 1 are stacked, a pair of end plates 20 covering both end surfaces of battery stack body 10, a plurality of fastening members 15 fastening end plates 20 to each other, and insulating sheet 30 interposed between each of the plurality of fastening members 15 and battery stack body 10.

(Battery stack body 10)

As shown in FIGS. 1 and 2 and the like, battery stack body 10 includes a plurality of secondary battery cells 1 including positive and negative electrode terminals 2, and a bus bar (not illustrated) connected to electrode terminals 2 of the plurality of secondary battery cells 1 and connecting the plurality of secondary battery cells 1 in parallel and in series. The plurality of secondary battery cells 1 are connected in parallel and in series via these bus bars. Secondary battery cell 1 is a chargeable and dischargeable secondary battery. In power supply device 100, the plurality of secondary battery cells 1 are connected in parallel to constitute a parallel battery group, and a plurality of parallel battery groups are connected in series, so that a large number of secondary battery cells 1 are connected in parallel and in series. In power supply device 100 shown in FIGS. 1 to 3, the plurality of secondary battery cells 1 are stacked to form battery stack body 10. The pair of end plates 20 are disposed on both end surfaces of battery stack body 10. End parts of fastening members 15 are fixed to end plates 20, and secondary battery cells 1 in the stacked state are fixed into a pressed state.

(Secondary battery cell 1)

Secondary battery cell 1 is a prismatic battery having constant cell thickness CD with a quadrangular outer shape of the main surface, which is a wide surface, and has a thickness smaller than the width. Furthermore, secondary battery cell 1 is a secondary battery that can be charged and discharged, and is a lithium ion secondary battery. However, the present invention does not specify the secondary battery cell to a prismatic battery, and also does not specify the secondary battery cell to a lithium ion secondary battery. As the secondary battery cell, it is also possible to use any chargeable battery such as a non-aqueous electrolyte secondary battery and a nickel-metal hydride secondary battery cell other than the lithium ion secondary battery.

As shown in FIGS. 2 to 7, in secondary battery cell 1, an electrode body in which positive and negative electrode plates are stacked is housed in exterior can 1a, and filled with an electrolytic solution to airtightly seal exterior can 1a. Exterior can 1a is molded into a bottomed rectangular tubular shape, and an upper opening is airtightly closed with sealing plate 1b of a metal plate. Exterior can 1a is manufactured by deep-drawing a metal plate such as aluminum or an aluminum alloy. Sealing plate 1b is made of a metal plate such as aluminum or an aluminum alloy in the same manner as exterior can 1a. Sealing plate 1b is inserted into an opening of exterior can 1a. A boundary between an outer periphery of sealing plate 1b and an inner periphery of exterior can 1a is irradiated with laser light, and sealing plate 1b is airtightly fixed to exterior can 1a by laser welding.

(Electrode terminal 2)

In secondary battery cell 1, positive and negative electrode terminals 2 are fixed to both ends of terminal surface 1X with sealing plate 1b, which is a top surface, being used as terminal surface 1X as shown in FIGS. 3 to 5 and the like. A projection part of electrode terminal 2 has a columnar shape. However, the projection part is not necessarily a column, and may be a polygonal prism or an elliptic column.

The positions of positive and negative electrode terminals 2 to be fixed to sealing plate 1b of secondary battery cell 1 are the positions where the positive electrode and the negative electrode become bilaterally symmetrical. Thus, as shown in FIGS. 3 to 5 and the like, secondary battery cells 1 are laterally inverted and stacked, and electrode terminals 2 of the positive electrode and the negative electrode that are adjacent and close to each other are connected by a bus bar, so that adjacent secondary battery cells 1 can be connected in series. The present invention does not specify a number of secondary battery cells constituting the battery stack body and the connection state thereof. The number of secondary battery cells constituting the battery stack body and the connection state thereof can be variously changed including other exemplary embodiments to be described later.

(Battery stack body 10)

The plurality of secondary battery cells 1 are stacked such that the thickness direction of each secondary battery cell 1 is the stack direction to constitute battery stack body 10. In battery stack body 10, the plurality of secondary battery cells 1 are stacked such that terminal surface 1X on which positive and negative electrode terminals 2 are provided, and sealing plate 1b in FIGS. 1 to 6 are on the same plane.

In battery stack body 10, insulating spacer 16 may be interposed between secondary battery cells 1 stacked adjacent to each other. Insulating spacer 16 is an insulating material made of resin or the like manufactured in a thin plate shape or a sheet shape. Insulating spacer 16 has a plate shape having substantially the same size as the opposing surface of secondary battery cell 1. Insulating spacer 16 is stacked between secondary battery cells 1 adjacent to each other, whereby adjacent secondary battery cells 1 can be insulated from each other. As the spacer disposed between adjacent secondary battery cells, it is also possible to use a spacer having a shape in which a flow path of a cooling gas is formed between the secondary battery cells and the spacer. In addition, the surface of the secondary battery cell can be covered with an insulating material. For example, the surface of the exterior can excluding the electrode part of the secondary battery cell may be thermally welded with a shrink tube such as a polyethylene terephthalate (PET) resin. In this case, the insulating spacer may be omitted. Furthermore, in a power supply device in which a plurality of secondary battery cells are connected in massively parallel and massively series, insulating spacers are interposed between the secondary battery cells connected in series to insulate therebetween. On the other hand, in between the secondary battery cells connected in parallel, a voltage difference does not occur between adjacent exterior cans, and thus the insulating spacer between these secondary battery cells can be omitted.

Furthermore, in power supply device 100 shown in FIG. 2, end plates 20 are disposed on both end surfaces of battery stack body 10. End surface spacer 17 may be interposed between end plate 20 and battery stack body 10 to insulate end plate 20 and battery stack body 10 from each other. End surface spacer 17 can also be an insulating material made of resin or the like manufactured in a thin plate shape or a sheet shape.

In power supply device 100 according to the first exemplary embodiment, in battery stack body 10 in which the plurality of secondary battery cells 1 are stacked on each other, electrode terminals 2 of the plurality of secondary battery cells 1 adjacent to each other are connected by a bus bar, and the plurality of secondary battery cells 1 are connected in parallel and in series. A bus bar holder may be disposed between battery stack body 10 and the bus bar. By using the bus bar holder, a plurality of bus bars can be disposed at fixed positions on the upper surface of the battery stack body while insulating the plurality of bus bars from each other and insulating the terminal surfaces of the secondary battery cells and the bus bars.

A metal plate is cut and processed, and thus the bus bar is manufactured into a predetermined shape. As the metal plate constituting the bus bar, a metal having low electric resistance and light weight, for example, an aluminum plate, a copper plate, or an alloy thereof can be used. However, as the metal plate of the bus bar, other metals having small electric resistance and light weight or alloys thereof can also be used.

(End plate 20)

As shown in FIGS. 1 to 3, end plates 20 are disposed to both ends of battery stack body 10 and fastened via a pair of right and left fastening members 15 disposed along both side surfaces of battery stack body 10. End plates 20 are disposed at both ends of battery stack body 10 in the stack direction of secondary battery cells 1 and outside end surface spacer 17 to sandwich battery stack body 10 from both ends.

(Step portion 20b)

End plate 20 forms step portion 20b for locking locking block 15b provided on fastening member 15 in a state of being fastened by fastening member 15. Step portion 20b is formed in a size and a shape enough to be able to lock locking block 15b of fastening member 15 described later. In the example of FIG. 2, flange-shaped step portion 20b is formed such that end plate 20 has a T-shape in a horizontal cross-sectional view. End plate screw hole 20c is opened near step portion 20b.

(Fastening member 15)

Both ends of fastening member 15 are fixed to end plates 20 disposed on both end surfaces of battery stack body 10. End plates 20 are fixed by the plurality of fastening members 15, thereby fastening battery stack body 10 in the stack direction. As shown in FIGS. 9 to 11 and the like, each fastening member 15 is made of metal having a predetermined width and a predetermined thickness along the side surface of battery stack body 10, and is disposed to face both side surfaces of battery stack body 10.

Fastening member 15 includes fastening parts 15c fixed to end plates 20 at both ends in the longer direction, intermediate part 15a coupling fastening parts 15c with each other, and a plurality of tabs 15l projecting from above and below intermediate part 15a. Fastening parts 15c, intermediate part 15a, and the plurality of tabs 15l are preferably integrally formed of a metal plate. In the example of FIG. 9 and the like, a metal plate is bent to form wavy portion 15j in intermediate part 15a, and the upper and lower end edges of intermediate par 15a are bent to form tabs 15l. As shown in FIGS. 3, 5, and the like, wavy portion 15j includes a plurality of wavy pieces 15i and flat pieces 15k. Wavy pieces 15i are connected by flat piece 15k.

On the other hand, fastening part 15c of fastening member 15 is provided with locking block 15b as shown in FIG. 11, and the thickness of fastening part 15c of this part is increased. Locking block 15b is locked to step portion 20b of end plate 20, and fastening member 15 is fixed to end plate 20 by screwing or the like.

(Insulating sheet 30)

Insulating sheet 30 is interposed between fastening member 15 and battery stack body 10. Insulating sheet 30 is made of a material having an insulating property, e.g., resin, and insulates between metal fastening member 15 and the battery cell. Insulating sheet 30 shown in FIG. 2 and the like includes flat plate 31 covering the side surface of battery stack body 10, and tab support portions 32 provided above and below flat plate 31. Tab support portion 32 is interposed between each tab 15l of fastening member 15 and the upper surface of secondary battery cell 1 and insulates between tab 15l and secondary battery cell 1. Tab support portion 32 is provided for each tab 15l formed on fastening member 15. Therefore, tab support portion 32 is formed so as to match the interval at which tab 15l of fastening member 15 is formed. Furthermore, insulating sheet 30 may also be used as the bus bar holder holding the bus bar described above.

It is possible to make the insulating sheet unnecessary when the battery stack body or the surface of the battery stack body is insulated, e.g., when the secondary battery cell is housed in an insulating case or covered with a heat-shrinkable tube made of resin, when an insulating paint or coating is applied to the surface of the fastening member, or when the fastening member is made of an insulating material.

(Wavy portion 15j)

Intermediate part 15a has wavy portion 15j formed in a wavy shape. In wavy portion 15j, the plurality of wavy pieces 15i are periodically formed at an interval according to cell thickness CD of secondary battery cell 1. By forming intermediate part 15a into a spring shape and imparting each wavy piece 15i a spring property, it is possible to deform, even if battery stack body 10 expands, wavy portion 15j so as to follow the expansion, and displace intermediate part 15a, and it is possible to avoid a situation in which stress is concentrated on the fastening member and the fastening member breaks. On the other hand, when battery stack body 10 returns from the expanded state, wavy portion 15j deforms accordingly, and returns to the original shape, whereby the fastened state of battery stack body 10 by the fastening member is maintained. Fastening member 15 thus having wavy portion 15j can be deformed according to the change in the stack direction of battery stack body 10, and the fastening state can be maintained.

Figure 12:
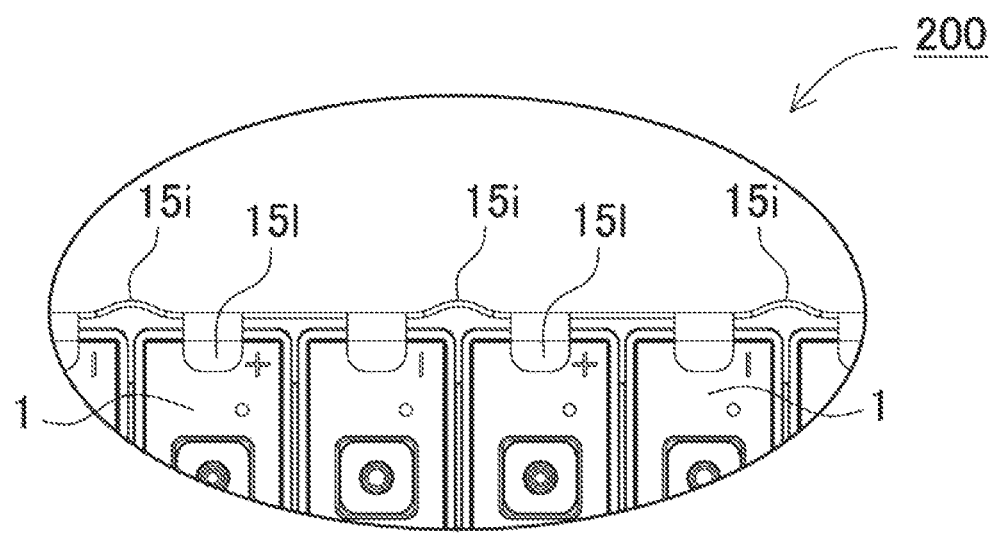
FIG. 12 is an enlarged plan view of a main part of a power supply device according to a second exemplary embodiment without illustration of an insulating sheet.

At least one wavy piece 15i is formed for the plurality of secondary battery cells 1. Preferably, as shown in the enlarged plan view of FIG. 5 and the like, wavy piece 15i is formed for each secondary battery cell of battery stack body 10. This makes it possible to individually cope with deformation of the exterior can of each secondary battery cell 1. However, the wavy piece is not necessarily needed to be formed for each secondary battery cell, and as in the plan view of power supply device 200 according to a second exemplary embodiment without illustration of the insulating sheet shown in FIG. 12 for example, wavy piece 15i may be formed for every other secondary battery cell, i.e., every two secondary battery cells. The interval at which wavy piece 15i is formed is appropriately designed according to the specification of the secondary battery cell, the battery capacity, the expected use environment (temperature, humidity, and the like) of the power supply device, the expected deformation amount of the exterior can, and the like. Wavy piece 15i is bent in a chevron shape in a direction of expanding outward of battery stack body 10 as shown in FIG. 5. Thus, by projecting wavy piece 15i outward, it is possible to avoid a situation in which wavy piece 15i interferes with battery stack body 10.

Furthermore, each wavy piece 15i may be formed in a plurality of chevron shapes other than one chevron shape. The shape is not limited to the curved state, and may be a zigzag shape, a bellows shape, an accordion shape, or the like. Furthermore, wavy pieces 15i may not have the same shape, and the shape of wavy piece 15i may be changed according to the position.

(Tab 15l)

Each of the plurality of fastening members 15 forms tab 15l abutting on the upper surface of secondary battery cell 1 of battery stack body 10. As shown in the enlarged perspective view of FIG. 3 and the vertical cross-sectional view of FIG. 7, tab 15l presses the upper surface of secondary battery cell 1 via tab support portion 32 of insulating sheet 30. Thus, each secondary battery cell 1 is pressed by tab 15l in the up-down direction and held in the height direction. Even if vibration, impact, or the like is applied to battery stack body 10, each secondary battery cell 1 can be maintained so as not to be displaced in the up-down direction.

The position where tab 15l is provided in fastening member 15 is preferably a position different from the position of wavy piece 15i. In the examples shown in FIGS. 3, 5, and the like, tab 15l is formed on flat piece 15k positioned between wavy pieces 15i. Thus, it is possible to avoid a situation in which tab 15l bent from intermediate part 15a blocks deformation of wavy piece 15i, and to effectively exhibit the spring property of wavy piece 15i.

As fastening member 15, a metal plate such as iron, preferably a steel plate, iron, an iron alloy, SUS, aluminum, an aluminum alloy, or the like can be used. With fastening member 15 including the same member, fastening part 15c and intermediate part 15a may have different thicknesses. Alternatively, fastening part 15c may be made of a first metal, and intermediate part 15a may be made of a second metal different from the first metal. In this case, the first metal has higher rigidity than that of the second metal, and the second metal has higher stretchability than that of the first metal. By selecting such dissimilar metals, it is possible to impart rigidity to fastening part 15c and stretchability to intermediate part 15a.

(Locking block 15b)

As shown in FIGS. 9 to 11, fastening member 15 includes intermediate part 15a, fastening part 15c, and a block-shaped locking block 15b. Intermediate part 15a is a plate-like member, and fastening parts 15c are bonded to both ends of intermediate part 15a in the longer direction. Locking block 15b is fixed to an inner surface of an end edge part of fastening part 15c. Locking block 15b has a plate shape having a predetermined thickness, and is fixed in an attitude of projecting toward the inside of fastening part 15c. In a state where fastening member 15 is coupled to end plate 20, locking block 15b is locked to step portion 20b provided on end plate 20 to dispose fastening member 15 at fixed positions on both sides of battery stack body 10. Locking block 15b is fixed to fastening part 15c by welding such as spot welding or laser welding.

Locking block 15b shown in the figure opens fastening-side through hole 15bc so as to coincide with end plate screw hole 20c in a state where end plate 20 is fastened. Fastening part 15c has fastening main surface-side through hole 15ac opened at a position corresponding to fastening-side through hole 15bc. Fastening-side through hole 15bc and fastening main surface-side through hole 15ac are designed to match in a state where locking block 15b is fixed to fastening part 15c.

A plurality of opened fastening-side through holes 15bc of locking block 15b are opened in the extending direction of locking block 15b. Similarly, a plurality of fastening main surface-side through holes 15ac are also opened along the end edge of fastening part 15c or in the extending direction of locking block 15b. In accordance with this, a plurality of end plate screw holes 20c are formed along the side surface of end plate 20.

Locking block 15b is fixed to the outer peripheral surface of end plate 20 via a plurality of bolts 15f. Fixing of fastening member 15 with locking block 15b and end plate 20 is not necessarily limited to screwing using bolts, and may be with pins, rivets, or the like.

As described above, iron, an iron alloy, SUS, aluminum, an aluminum alloy, or the like can be used for intermediate part 15a, fastening part 15c, and locking block 15b that constitute fastening member 15. Locking block 15b can have a width of equal to or more than 10 mm in the battery stack direction. Furthermore, end plate 20 can be made of metal. Preferably, locking block 15b and fastening part 15c are made of the same metal. This makes it easy to weld locking block 15b and fastening part 15c.

As described above, not by bending fastening member 15 at the right and left end parts in the longer direction, i.e., at both end parts in the stacked layer direction of battery stack body 10 and screwing fastening member 15 from the main surface of end plate 20, but by fastening battery stack body 10 by a locking structure and screwing by step portion 20b of end plate 20 and locking block 15b without providing fastening member 15 with a bent part as a flat plate shape in the stack direction of battery stack body 10 as shown in FIGS. 1 to 3, it is possible to enhance rigidity and to mitigate the risk of breakage or the like due to expansion of secondary battery cells 1.

The power supply device in which the large number of secondary battery cells 1 are stacked is configured to bind a plurality of secondary battery cells 1 by coupling, by fastening members 15, end plates 20 disposed at both ends of battery stack body 10 including the plurality of secondary battery cells 1. By binding the plurality of secondary battery cells 1 via highly rigid end plate 20 and fastening member 15, it is possible to suppress expansion, deformation, relative movement, malfunction due to vibration, and the like of secondary battery cells 1 due to charging and discharging and deterioration.

As described above, according to power supply device 100 according to the present exemplary embodiment, the stress to be expanded in the battery stack direction generated by expansion of secondary battery cells 1 is applied not only to fastening part 15c itself but also to each member of the engagement by step portion 20b and locking block 15b, welding by fastening part 15c and locking block 15b, and screwing by bolt 15f. Therefore, by enhancing the rigidity of these members and appropriately dispersing the stress, it is possible to enhance the rigidity as a whole and achieve power supply device 100 that can cope with expansion and contraction of secondary battery cell 1. Furthermore, since wavy portion 15j having wavy piece 15i deforms according to expansion of the secondary battery cell, it is possible to cope with the displacement of battery stack body 10.

The power supply device described above can be used as a power supply for a vehicle that supplies electric power to a motor that causes an electric vehicle to travel. As an electric vehicle on which the power supply device is mounted, an electric vehicle such as a hybrid vehicle or a plug-in hybrid vehicle that travels by both an engine and a motor, or an electric vehicle that travels only by a motor can be used, and is used as a power supply for these vehicles. Note that, in order to obtain power for driving the electric vehicle, an example will be described in which a large number of the above-described power supply devices are connected in series or in parallel, and the large-capacity, high-output power supply device to which a necessary control circuit is further added is constructed.

(Power supply device for hybrid vehicle)

Figure 13:
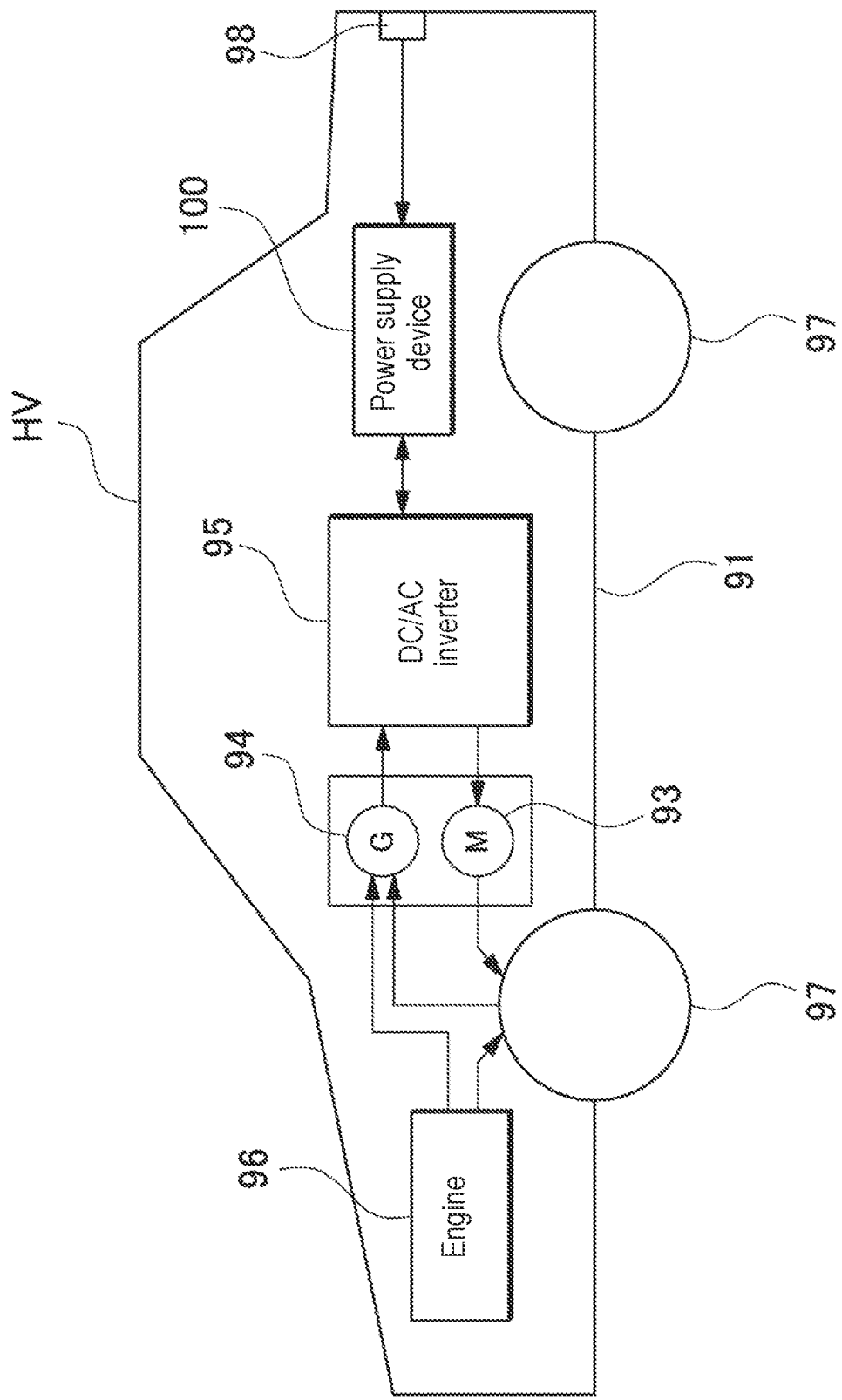
FIG. 13 is a block diagram showing an example in which the power supply device is mounted on a hybrid vehicle traveling by an engine and a motor.

FIG. 13 shows an example in which the power supply device is mounted on a hybrid vehicle that travels by both an engine and a motor. Vehicle HV on which the power supply device illustrated in this drawing is mounted includes vehicle body 91, engine 96 and traveling motor 93 that cause vehicle body 91 to travel, wheels 97 driven by engine 96 and traveling motor 93, power supply device 100 that supplies power to motor 93, and generator 94 that charges a battery of power supply device 100. The power supply device 100 is connected to the motor 93 and the generator 94 via the DC/AC inverter 95. The vehicle HV travels by both the motor 93 and the engine 96 while charging and discharging the battery of the power supply device 100. The motor 93 is driven to cause the vehicle to travel in an area with poor engine efficiency, for example, at the time of acceleration or low speed traveling. The motor 93 is driven by power supplied from the power supply device 100. Generator 94 is driven by engine 96 or by regenerative braking when braking the vehicle to charge the battery of power supply device 100. As shown in FIG. 13, vehicle HV may include charging plug 98 for charging power supply device 100.

Power supply device 100 can be charged by connecting charging plug 98 to an external power supply.

(Power supply device for electric vehicle)

Figure 14:
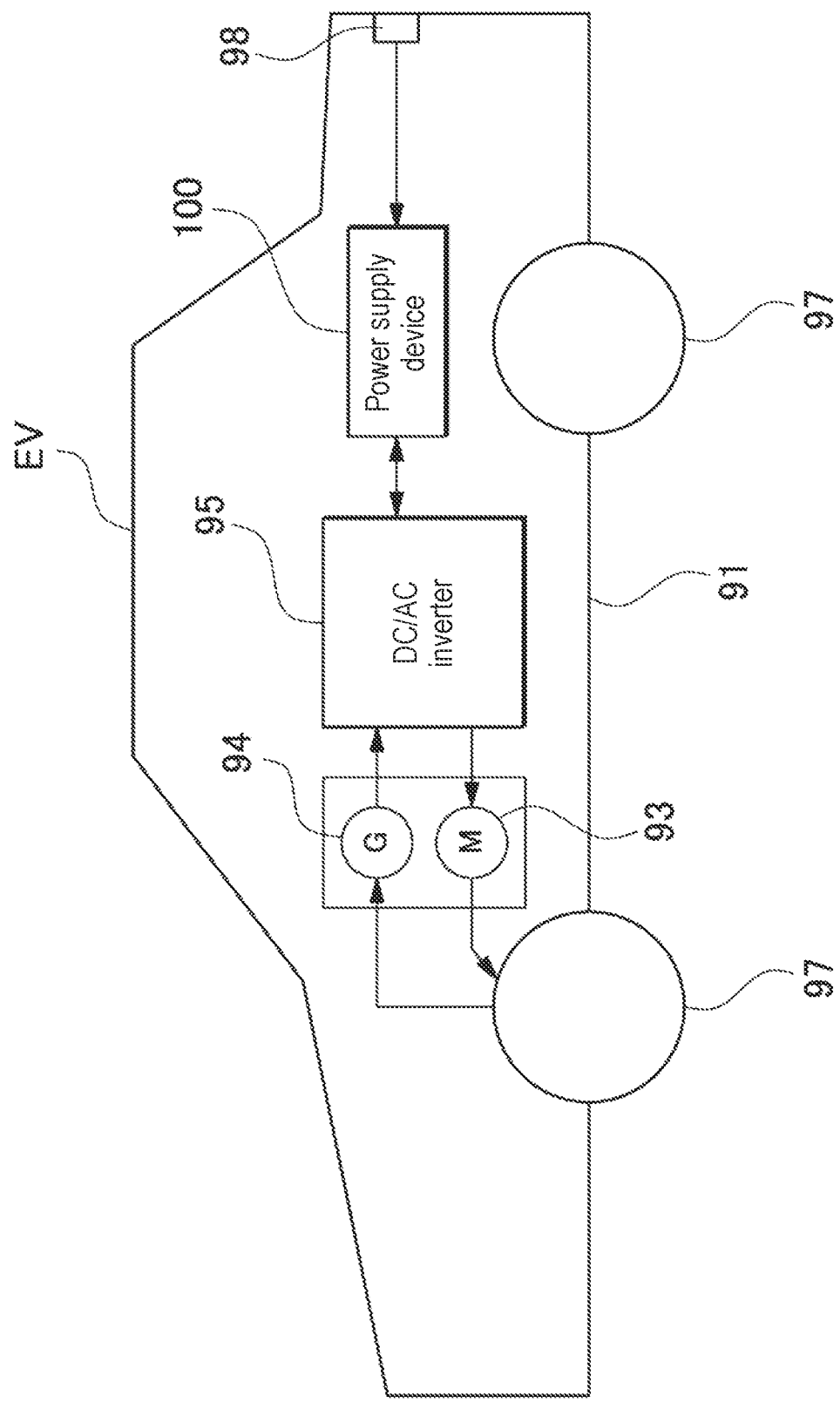
FIG. 14 is a block diagram showing an example in which the power supply device is mounted on an electric vehicle traveling only by a motor.

FIG. 14 shows an example in which the power supply device is mounted on an electric vehicle that travels only by a motor. Vehicle EV on which the power supply device illustrated in this drawing is mounted includes vehicle body 91, traveling motor 93 that causes vehicle body 91 to travel, wheels 97 driven by motor 93, power supply device 100 that supplies power to motor 93, and generator 94 that charges the battery of power supply device 100. The power supply device 100 is connected to the motor 93 and the generator 94 via the DC/AC inverter 95. The motor 93 is driven by power supplied from the power supply device 100. The generator 94 is driven by the energy at the time of regenerative braking of the vehicle EV to charge the battery of the power supply device 100. In addition, vehicle EV includes charging plug 98, and power supply device 100 can be charged by connecting charging plug 98 to an external power supply.

(Power supply device for power storage device)

Figure 15:
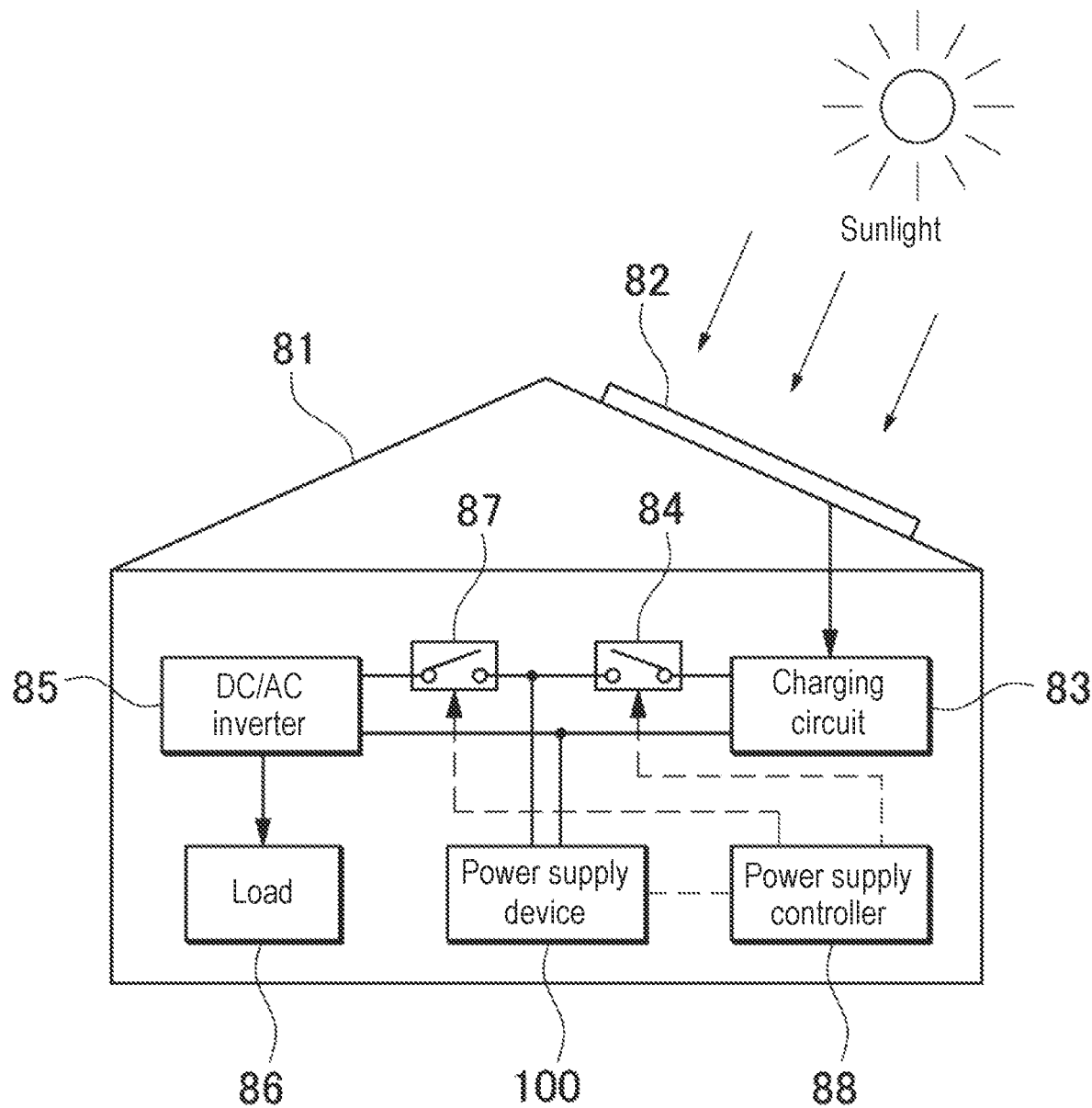
FIG. 15 is a block diagram showing an example of application to a power supply device for power storage.

Furthermore, the present invention does not specify the application of the power supply device as the power supply for a motor that drives a vehicle. The power supply device according to the exemplary embodiments can also be used as a power supply for a power storage device that stores electricity by charging a battery with electric power generated by solar power generation, wind power generation, or the like. FIG. 15 shows a power storage device that stores electricity by charging the battery of power supply device 100 with solar cell 82.

The power storage device shown in FIG. 15 charges the battery of power supply device 100 with electric power generated by solar cell 82 disposed on a roof, a rooftop, or the like of building 81 such as a house or a factory. This power storage device charges the battery of power supply device 100 by charging circuit 83 using solar cell 82 as a charging power source, and then supplies electric power to load 86 via DC/AC inverter 85. Therefore, this power storage device includes a charging mode and a discharging mode. In the power storage device shown in the figure, DC/AC inverter 85 and charging circuit 83 are connected to power supply device 100 via discharging switch 87 and charging switch 84, respectively. ON/OFF of discharging switch 87 and charging switch 84 is switched by power supply controller 88 of the power storage device. In the charging mode, power supply controller 88 switches charging switch 84 to on and switches discharging switch 87 to off to permit charging from charging circuit 83 to power supply device 100. When the charging is completed and the battery is fully charged, or in a state where a capacity equal to or greater than a predetermined value is charged, power supply controller 88 turns off charging switch 84 and turns on discharging switch 87 to switch to the discharging mode, and permits discharge from power supply device 100 to load 86. Furthermore, it is also possible to simultaneously perform electric power supply to load 86 and charging of power supply device 100 by turning on charging switch 84 and turning on discharging switch 87 as necessary.

Furthermore, although not illustrated, the power supply device can also be used as a power supply for a power storage device that charges and stores a battery using midnight electric power at night. The power supply device charged with the midnight power can be charged with the midnight electric power, which is surplus power of the power plant, outputs power in the daytime when the power load becomes large, and limit the peak power in the daytime to be small. Further, the power supply device can also be used as a power supply that charges with both the output of the solar cell and the midnight power. This power supply device can efficiently store electricity in consideration of weather and power consumption by effectively using both power generated by the solar cell and midnight electric power.

The power storage system as described above can be suitably used for applications such as a backup power supply device that can be mounted on a rack of a computer server, a backup power supply device for a wireless base station such as a mobile phone, a power supply for household or factory power storage, a power storage device combined with a solar cell such as a power supply for street lamps, and a backup power supply for traffic lights and traffic indicators for roads.

INDUSTRIAL APPLICABILITY

The power supply device according to the present invention and the vehicle including the power supply device can be suitably used as a large-current power supply used for a power supply of a motor for driving an electric vehicle such as a hybrid vehicle, a fuel cell vehicle, an electric vehicle, or an electric motorcycle. Examples thereof include power supply devices such as plug-in hybrid electric vehicles, hybrid electric vehicles, and electric vehicles that can switching between an electric vehicle (EV) traveling mode and a hybrid electric vehicle (HEV) traveling mode. In addition, the present invention can be appropriately used for applications such as a backup power supply device that can be mounted on a rack of a computer server, a backup power supply device for a wireless base station such as a mobile phone, a power supply for power storage for home and factory use, a power supply for street lamps, and the like, a power supply device combined with a solar cell, and a backup power supply for traffic lights and the like.

REFERENCE MARKS IN THE DRAWINGS

100, 200: power supply device
1: secondary battery cell
1X: terminal surface
1*a*: exterior can
1*b*: sealing plate
2: electrode terminal
10: battery stack body
15: fastening member
15*a*: intermediate part
15*b*: locking block
15*c*: fastening part
15*ac*: fastening main surface-side through hole
15*bc*: fastening-side through hole
15*f*: bolt
15*i*: wavy piece
15*j*: wavy portion
15*k*: flat piece
15*l*: tab
16: insulating spacer
17: end surface spacer
20: end plate
20*b*: step portion
20*c*: end plate screw hole
30: insulating sheet
31: flat plate
32: tab support portion
81: building
82: solar cell 83: charging circuit
84: charging switch
85: DC/AC inverter
86: load
87: discharging switch
88: power supply controller
91: vehicle body
93: motor
94: generator
95: DC/AC inverter
96: engine
97: wheel
98: charging plug
900: power supply device
901: secondary battery cell
902: spacer
903: end plate
904: binding bar
CD: cell thickness
HV, EV: vehicle

The invention claimed is:

1. A power supply device comprising:
a plurality of secondary battery cells each including a prismatic exterior can and a cell thickness and the cell thickness being constant;
a pair of end plates covering both end surfaces of a battery stack body including the plurality of secondary battery cells are stacked; and
a plurality of fastening members each including a plate shape extending along stacking of the plurality of secondary battery cells and disposed on opposite side surfaces of the battery stack body to fasten the end plates to each other,
wherein each of the plurality of fastening members includes a wavy portion including a plurality of wavy pieces bent in a cross-sectional view are periodically disposed at an interval according to the cell thickness.

2. The power supply device according to claim 1, wherein at least one of the wavy pieces is disposed for the plurality of secondary battery cells.

3. The power supply device according to claim 1, wherein each of the wavy pieces is disposed for a corresponding of the cell thicknesses.

4. The power supply device according to claim 1, wherein each of the wavy pieces is bent in a chevron shape in a direction of expanding outward of the battery stack body.

5. The power supply device according to claim 1, wherein the wavy portion is disposed in a spring shape.

6. The power supply device according to claim 1, wherein each of the plurality of fastening members includes a tab abutting on an upper surface of each of the plurality of secondary battery cells of the battery stack body.

7. The power supply device according to claim 6, wherein the tab is disposed into a flat piece with a flat shape disposed between the wavy pieces.

8. The power supply device according to claim 1, wherein the plurality of fastening members containing metal, and
the power supply device further includes an insulating sheet interposed between each of the plurality of fastening members and the battery stack body and the insulating sheet including insulation.

9. A vehicle including the power supply device according to claim 1, the vehicle comprising:
the power supply device;
a motor for traveling supplied electric power from the power supply device;
a vehicle body mounting the power supply device and the motor; and
wheels driven by the motor to cause the vehicle body to travel.

10. A power storage device including the power supply device according to claim 1, the power storage device comprising:
the power supply device; and
a power supply controller that controls charging and discharging of the power supply device, wherein the power supply controller enables charging of the secondary battery cells by external electric power and causes the secondary battery cells to charge.

* * * * *